US 7,958,175 B2

(12) United States Patent
Pomet et al.

(10) Patent No.: US 7,958,175 B2
(45) Date of Patent: Jun. 7, 2011

(54) METHOD AND DEVICE FOR GENERATING A RANDOM NUMBER IN A USB (UNIVERSAL SERIAL BUS) PERIPHERAL

(75) Inventors: Alain Pomet, Marseilles (FR); Benjamin Duval, Saint Maximin (FR); Robert Leydier, La Londe les Maures (FR)

(73) Assignees: STMicroelectronics SA, Montrouge (FR); Axalto SA, Montrouge (FR)

( * ) Notice: Subject to any disclaimer, the term of this patent is extended or adjusted under 35 U.S.C. 154(b) by 1149 days.

(21) Appl. No.: 11/653,185

(22) Filed: Jan. 12, 2007
(Under 37 CFR 1.47)

(65) Prior Publication Data
US 2009/0089347 A1 Apr. 2, 2009

(30) Foreign Application Priority Data

Jan. 12, 2006 (FR) ...................................... 06 00251

(51) Int. Cl.
*G06F 1/02* (2006.01)
(52) U.S. Cl. ........................................ 708/251; 708/255
(58) Field of Classification Search .................. 708/251, 708/255
See application file for complete search history.

(56) References Cited

U.S. PATENT DOCUMENTS

| 4,820,936 | A | * | 4/1989 | Veendrick et al. | 327/534 |
|---|---|---|---|---|---|
| 5,592,127 | A | * | 1/1997 | Mizuno | 331/57 |
| 6,061,702 | A | | 5/2000 | Hoffman | |
| 6,968,460 | B1 | * | 11/2005 | Gulick | 713/194 |
| 2001/0023423 | A1 | | 9/2001 | Marinet | |
| 2003/0067336 | A1 | * | 4/2003 | Cruz-Albrecht | 327/164 |
| 2005/0286718 | A1 | | 12/2005 | Meintrup et al. | |
| 2006/0173943 | A1 | * | 8/2006 | Luzzi et al. | 708/250 |

FOREIGN PATENT DOCUMENTS

EP 1 304 613 A2 4/2003
EP 1 343 073 A2 9/2003

* cited by examiner

*Primary Examiner* — Chuong D Ngo
(74) *Attorney, Agent, or Firm* — Lisa K. Jorgenson; Jeremiah J. Baunach; Seed IP Law Group PLLC

(57) ABSTRACT

A method for generating a random number, comprising steps of receiving a data transmission binary signal subjected to phase jitter, generating several oscillator signals substantially of a same average frequency and having distinct respective phases, sampling a status of each of the oscillator signals upon the appearance of edges of the binary signal, and of generating a random number using the statuses of each of the oscillator signals. The method may be applied to an integrated circuit usable in a smart card.

21 Claims, 3 Drawing Sheets

METHOD AND DEVICE FOR GENERATING A RANDOM NUMBER IN A USB (UNIVERSAL SERIAL BUS) PERIPHERAL

BACKGROUND OF THE INVENTION

1. Field of the Invention

The present description relates to the generation of random or pseudo-random numbers in an integrated circuit, and in particular, but not exclusively, smart card integrated circuits or integrated circuits equipped with a communication interface conforming to the USB (Universal Serial Bus) standard.

2. Description of the Related Art

Random or pseudo-random numbers are used by numerous functions such as encryption functions or protection functions for protection against attacks particularly by fault injection.

There are many methods for generating a random number. Thus, certain methods use an internal noise signal that is sampled to generate a random variable. The noise signals are generally of very low amplitudes. It is therefore necessary to amplify them. This amplification introduces a correlation factor, because the amplifier is also subjected to the same conditions (same technology, supply voltage, temperature, etc.) as the internal source of noise. Such a correlation enables the random variable generator to be controlled from the external environment, and therefore to be used to inject errors into the integrated circuit if it is used in a smart card.

In U.S. patent application Ser. No. 09/805,265, a first sawtooth signal is sampled by a second signal. The two signals are asynchronous. The amplitude of each sample is compared with a threshold voltage, and the result of the comparison supplies the value of a bit of a pseudo-random number. This method for generating a random number requires two sources of signals to be implemented. The random nature of the numbers generated depends, in particular, on the level of correlation between the source of the sawtooth signal and the source of the sampling signal. Now, in an integrated circuit, such as those used to equip smart cards, it is difficult to produce decorrelated oscillators, due to the fact that these units are produced with the same technology and are subjected to the same environmental conditions (temperature, sound and light) and electrical supply conditions (average amplitude, level of amplitude and frequency interference). In smart cards, the use of an external source of signals is not desirable because it may impair the resistance of the chip to attacks.

BRIEF SUMMARY OF THE INVENTION

One embodiment of the present invention uses the random nature of the phase shifts or jitter that occur in certain digital data transmissions, and in particular in the signals transmitted by serial links such as USB-type links. This phase jitter has the advantage of resulting from the combination of several non-correlated contributions such as the contributions from the user, from the local application, from the local clock, from the sharing of the bus with other peripherals, from the function performed by the smart card, from the traffic generators and from the processing times. This phase jitter is difficult to control, and therefore, its use by a random number generator increases the resistance of the integrated circuit to attacks by fault injection.

One embodiment of the present invention provides a method for generating a random number that comprises steps of:
receiving a data transmission binary signal subjected to phase jitter,
generating several oscillator signals substantially of a same average frequency and having distinct respective phases,
sampling a status of each of the oscillator signals upon the appearance of edges of the binary signal, and
generating a random number using the status of each of the oscillator signals.

According to one embodiment of the present invention, a status of each of the oscillator signals is sampled upon each edge of the binary signal.

According to one embodiment of the present invention, the value of the random number generated varies according to the position of the edge of the binary signal in relation to the edges of the oscillator signals.

According to one embodiment of the present invention, the average phase deviation between two oscillator signals of consecutive phases is substantially constant.

According to one embodiment of the present invention, the oscillator signals have an average frequency at least four times greater than the average frequency of the data transmission rate of the data transmission binary signal.

According to one embodiment of the present invention, there are 8 oscillator signals, and the average phase deviation between two oscillator signals of consecutive phases is substantially equal to $\pi/4$.

According to one embodiment of the present invention, the binary signal received conforms to the USB standard.

Embodiments of the present invention also relate to a device for generating a random number. According to one embodiment, the device comprises:
a data transmission binary signal input subjected to phase jitter,
several oscillator signal inputs, the oscillator signals supplied at the oscillator signal inputs having an average frequency substantially identical and distinct respective phases,
sampling circuits for sampling a status of each of the oscillator signals upon edges of the binary signal, and
a logic circuit to generate bits of a random number according to the statuses of the oscillator signals.

According to one embodiment of the present invention, the device comprises means for sampling the clock signals upon each edge of the binary signal.

According to one embodiment of the present invention, the value of the random number generated by the logic circuit varies according to the position of the edge of the binary signal in relation to the edges of the oscillator signals.

Embodiments of the present invention also relate to an integrated circuit comprising:
a receive circuit for receiving a binary signal,
a data processing unit connected to the receive circuit, and
a circuit for generating oscillator signals connected to the receive circuit.

According to one embodiment of the present invention, the integrated circuit comprises a random number generating device as defined above, supplying the processing unit with random numbers, the random number generating device being connected to the clock signal generating circuit and to the receive circuit that supplies it with the binary signal received.

According to one embodiment of the present invention, the oscillator signal generating circuit comprises a ring oscillator supplying the random number generating device with oscillator signals substantially of a same average frequency and of distinct phases.

According to one embodiment of the present invention, the receive circuit conforms to the USB standard.

BRIEF DESCRIPTION OF THE SEVERAL VIEWS OF THE DRAWING(S)

These and other features and advantages of the present invention shall be presented in greater detail in the following description of an embodiment of the present invention, given in relation with, but not limited to the following figures, in which.

DETAILED DESCRIPTION OF THE INVENTION

Figure 1:
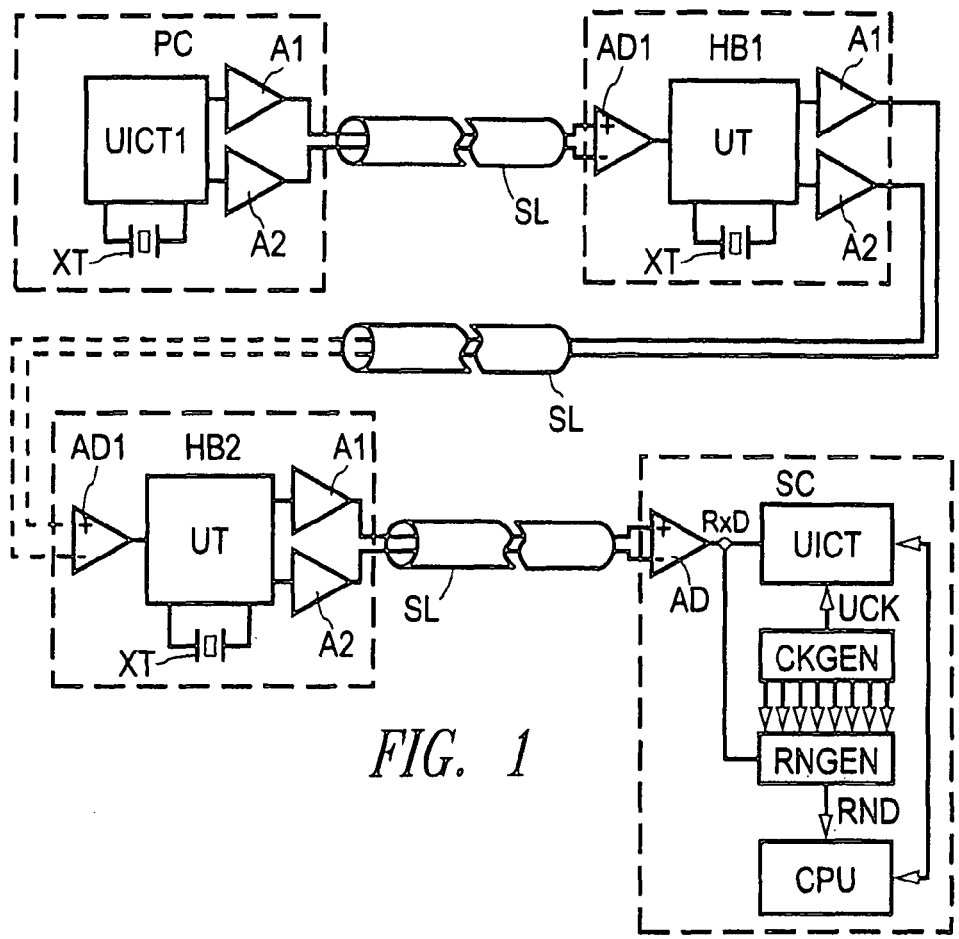
FIG. 1 represents in block form an integrated circuit connected to a computer through hubs, according to one illustrated embodiment.

FIG. 1 represents an integrated circuit SC connected to a computer PC through hubs HB1, HB2 and serial links SL. The computer PC comprises a serial link interface UICT1 paced by an oscillator XT and connected to transmit amplifiers A1, A2 for sending data on the serial link SL.

Each hub HB1, HB2 comprises a transceiver UT paced by an oscillator XT. The transceiver is connected to the serial link SL through a receiving amplifier AD1 for receiving, and through transmit amplifiers A1, A2 for sending.

The integrated circuit SC comprises a processing unit CPU, a serial link interface UICT connected to the serial link SL through a receiving amplifier AD. The integrated circuit also comprises a clock signal generating circuit CKGEN which supplies the interface UICT with a clock signal UCK.

According to one embodiment, the integrated circuit comprises a random number generating circuit RNGEN connected to the circuit CKGEN and supplying the processing unit with random numbers RND.

For more clarity of the figure, only the amplifiers used to transmit data from the computer PC to the integrated circuit SC have been represented.

Figure 2:
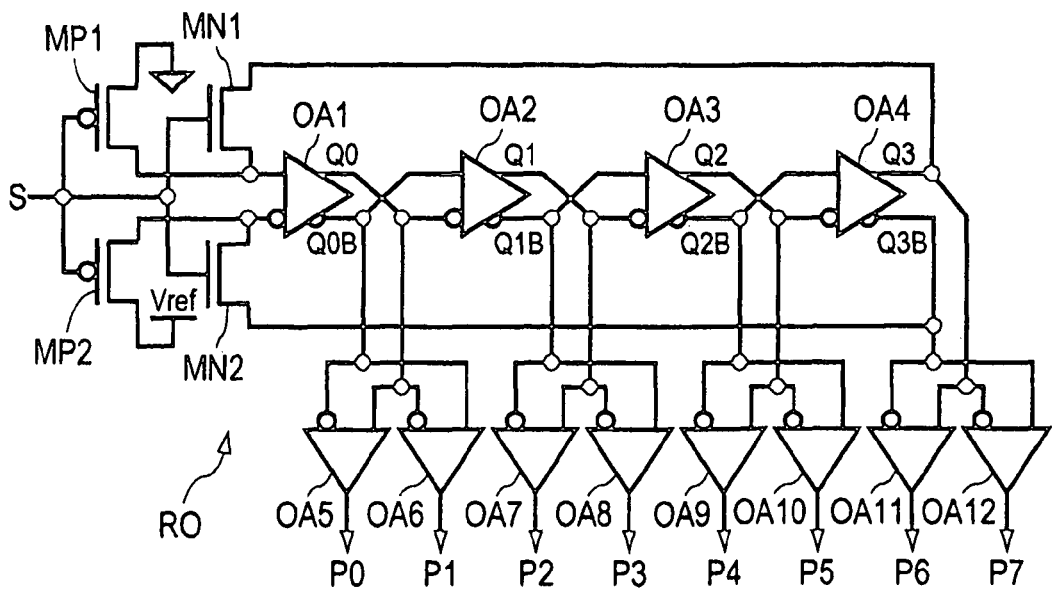
FIG. 2 represents an oscillator signal generating circuit of the integrated circuit, according to one illustrated embodiment.

FIG. 2 represents an oscillator RO of the clock signal generating circuit CKGEN. The oscillator RO, of ring oscillator type, comprises several differential amplifiers OA1-OA4 interconnected in a ring (4 oscillators in the example in the figure), two PMOS-type transistors MP1, MP2, and two NMOS-type transistors MN1, MN2. The oscillator RO also comprises several amplifiers OA5-OA12 each supplying an oscillator signal P0-P7.

Each of the amplifiers OA1-OA4 supplies two opposite phase signals Qi, QiB (i being a whole number between 0 and 3). The gates of the transistors MP1, MP2, MN1, MN2 receive a start signal S for starting the oscillator RO. The drain of the transistor MP1 is connected to the ground, and the source of this transistor is connected to the direct input of the amplifier OA1. The source of the transistor MP2 receives a reference voltage Vref, and the drain of this transistor is connected to the inverted input of the amplifier OA1. The source of the transistor MN1 is connected to the direct input of the amplifier OA1, and the drain of this transistor is connected to the output Q3 of the amplifier OA4. The source of the transistor MN2 is connected to the inverted input of the amplifier OA1, and the drain of this transistor is connected to the output Q3B of the amplifier OA4. The output Q0 of the amplifier OA1 is connected to the direct input of the amplifier OA5 and to the inverted input of the amplifier OA6. The output Q0B of the amplifier OA1 is connected to the inverted input of the amplifier OA5 and to the direct input of the amplifier OA6. The output Q1 of the amplifier OA2 is connected to the direct input of the amplifier OA7 and to the inverted input of the amplifier OA8. The output Q1B of the amplifier OA2 is connected to the inverted input of the amplifier OA7 and to the direct input of the amplifier OA8. The output Q2 of the amplifier OA3 is connected to the direct input of the amplifier OA9 and to the inverted input of the amplifier OA10. The output Q2B of the amplifier OA3 is connected to the inverted input of the amplifier OA9 and to the direct input of the amplifier OA10. The output Q3 of the amplifier OA4 is connected to the direct input of the amplifier OA11 and to the inverted input of the amplifier OA12. The output Q3B of the amplifier OA4 is connected to the inverted input of the amplifier OA11 and to the direct input of the amplifier OA12.

When the start signal S is inactive, the outputs Q3 and Q3B are not connected to the inputs of the amplifier OA1 and these inputs are respectively biased to the ground and Vref by the transistors MP1 and MP2. When the start signal S is active, the outputs Q3 and Q3B are connected to the inputs of OA1 that are insulated from the ground and from the voltage Vref. An oscillation is then produced.

The oscillator signals P0-P7 at output of the amplifiers OA5-OA12 have a same average period and are staggered by an average duration $\Delta\phi$ of one eighth of a period.

Figure 3:
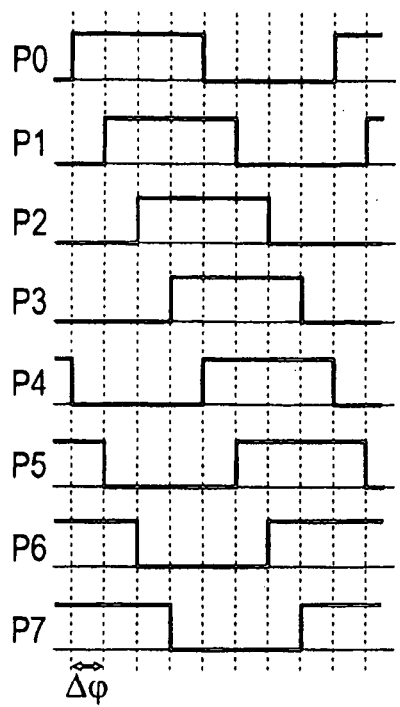
FIG. 3 shows in the form of timing diagrams the shape of oscillator signals supplied by the oscillator signal generating circuit, according to one illustrated embodiment.

FIG. 3 represents the shape of the oscillator signals P0-P7. In this figure, the signals P0-P7 are phase-shifted in relation to one another. Thus, two signals of consecutive phases Pi, Pi+1 (i being a whole number between 0 and 6) are phase-shifted by an average phase deviation $\Delta\phi$ substantially equal to $2\pi/n$, n being the number of signals P0-P7 generated. In the example in FIG. 3, there are 8 oscillator signals P0-P7 and the average phase deviation $\Delta\phi$ is equal to $\pi/4$.

Figure 4:
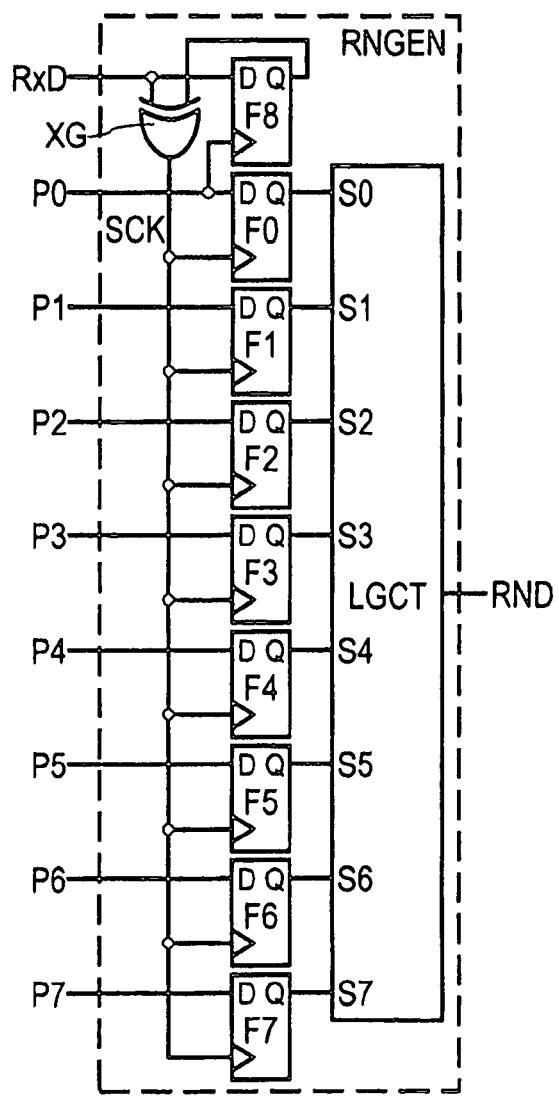
FIG. 4 represents a random number generating circuit according to the present invention, according to one illustrated embodiment.

FIG. 4 represents the random number generating circuit RNGEN. The circuit RNGEN comprises inputs for receiving the oscillator signals P0-P7, and a signal input for receiving the signal RxD. The circuit RNGEN comprises a flip-flop F8 and a logic gate XG of EXCLUSIVE OR type. The signal RxD at output of the amplifier AD is applied to a D input of the flip-flop F8 and to an input of the gate XG. The signal P0 is applied to the clock input of the flip-flop F8. The Q output of the flip-flop F8 is connected to another input of the gate XG the output of which supplies a signal SCK.

The circuit RNGEN comprises flip-flops F0-F7 the number of which corresponds to the number of the oscillator signals P0-P7. Each flip-flop receives at its D input one of the signals P0-P7 and at its clock input the signal SCK at output of the gate XG. The Q output of each flip-flop F0-F7 supplies a signal S0-S7 that is applied to an input of a logic circuit LGCT. The circuit LGCT supplies a random binary number RND at output.

Figure 5:
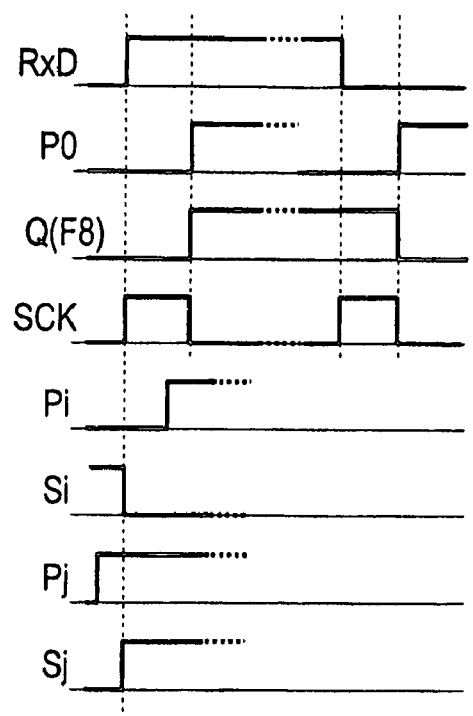
FIG. 5 shows in the form of timing diagrams the operation of the random number generating circuit, according to one illustrated embodiment.

To show the operation of the circuit RNGEN, FIG. 5 represents the shape of the signals RxD, P0 and SCK, and the shape of the signal Q(F8) at the Q output of the flip-flop F8.

When the signal Q(F8) is on 0, the signal P0 is on 0, and the signal RxD is on 1. When the signal RxD changes to 1, the output Q(F8) remains on 0 and the signal SCK at output of the gate XG changes to 1. When in this state, the signal P0 changes to 1, the output Q(F8) changes to 1 and the signal SCK changes to 0.

When the signal Q(F8) is on 1, the signal P0 is on 0 and the signal RXD is on 1. When in this state, the signal RXD changes to 0, the output Q(F8) remains on 1 and the signal SCK at output of the gate XG changes to 1. When the signal P0 changes to 1, the output Q(F8) changes to 0 and the signal SCK at output of the gate XG changes to 0.

Therefore, the signal SCK at output of the gate XG comprises a rising edge, i.e., changes to 1 upon each rising and falling edge of the signal RxD. The signal SCK comprises a falling edge, i.e., changes to 0 upon each rising edge of the signal P0.

The output signal Si (S0-S7) of each flip-flop Fi (F0-F7) changes to 0 upon a rising edge of the signal SCK if the signal Pi (P0-P7) applied at input of the flip-flop is on 0. Conversely, the output signal Sj (S0-S7) of each flip-flop Fj (F0-F7) changes to 1 upon a rising edge of the signal SCK if the signal Pj (P0-P7) applied at input of the flip-flop is on 1.

Thus, each flip-flop F0-F7 samples the status of the signal P0-P7 applied to its input upon each edge of the signal RxD.

Figure 6:
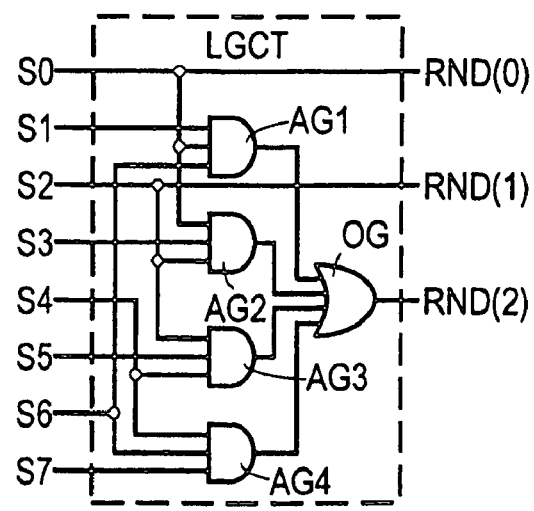
FIG. 6 represents a logic circuit of the random number generating circuit according to one illustrated embodiment.

FIG. 6 represents an example of a logic circuit LGCT enabling a random number RND to be generated according to the signals applied to the inputs S0-S7 of this circuit by the flip-flops F0-F7. The circuit LGCT supplies a random number RND on 3 bits RND(0), RND(1) and RND(2), upon each rising edge of the signal SCK, i.e., upon each edge of the signal RxD. The value of the number RND varies according to the position of this edge in relation to the rising edges of the oscillator signals P0-P7. For this purpose, the circuit LGCT comprises four AND-type logic gates AG1, AG2, AG3, AG4 with three inputs, and an OR-type logic gate with 4 inputs.

The output RND(0) is connected to the input S0 of the circuit LGCT. The output RND(1) is connected to the input S2. The inputs of the gate AG1 are connected to the inputs S0, S1 and S6. The inputs of the gate AG2 are connected to the inputs S0, S2 and S3. The inputs of the gate AG3 are connected to the inputs S2, S4 and S5. The inputs of the gate AG4 are connected to the inputs S4, S6 and S7. Each of the outputs of the gates AG1 to AG4 is connected to an input of the gate OG the output of which is connected to the output RND(2) of the circuit LGCT.

Thus, the circuit LGCT implements the following equations:

$$RND(0) = S0 \quad (1)$$

$$RND(1) = S2 \quad (2)$$

$$RND(2) = S0.S1.S6 + S0.S2.S3 + S2.S4.S5 + S4.S6.S7 \quad (3)$$

in which "." represents the AND operator, and "+" represents the OR operator.

The following table summarizes the values of the number RND obtained at output of the circuit RNGEN, and of the signals S0-S7 applied to the inputs of the circuit LGCT, according to the rising edges of the oscillator signals P0-P7 between which the edge of the signal RxD is situated:

TABLE 1

| | S0 | S1 | S2 | S3 | S4 | S5 | S6 | S7 | RND |
|---|---|---|---|---|---|---|---|---|---|
| P0/P1 | 1 | 0 | 0 | 0 | 0 | 1 | 1 | 1 | 001 |
| P1/P2 | 1 | 1 | 0 | 0 | 0 | 0 | 1 | 1 | 101 |
| P2/P3 | 1 | 1 | 1 | 0 | 0 | 0 | 0 | 1 | 011 |
| P3/P4 | 1 | 1 | 1 | 1 | 0 | 0 | 0 | 0 | 111 |
| P4/P5 | 0 | 1 | 1 | 1 | 1 | 0 | 0 | 0 | 010 |
| P5/P6 | 0 | 0 | 1 | 1 | 1 | 1 | 0 | 0 | 110 |
| P6/P7 | 0 | 0 | 0 | 1 | 1 | 1 | 1 | 0 | 000 |
| P7/P0 | 0 | 0 | 0 | 0 | 1 | 1 | 1 | 1 | 100 |

Table 1 shows that each possible position of an edge of the signal RxD in relation to the rising edges of the oscillator signals P0-P7 corresponds to a distinct value of the number RND.

It will be understood that any other combinational logic circuit can be considered to produce the numbers RND using the signals S0 to S7. It is sufficient that the circuit produces a value different from the number RND for each possible position of an edge of the signal RxD in relation to the rising edges of the oscillator signals P0-P7.

The circuit RNGEN that has just been described can be applied more particularly to a USB-type (Universal Serial Bus) serial link. According to the USB specifications, the data are transmitted on the link SL with a rate of 1.5 Mbit/s in low speed, 12 Mbit/s in full speed and 480 Mbit/s in high speed. Therefore, each data transmitter on the link SL comprises two amplifiers A1, A2. Each receiver comprises a differential amplifier AD, AD1. According to the number of hubs or intermediate repeaters between a transmitter and a final receiver, a more or less significant phase shift or jitter can appear, each transceiver adding phase jitter to the phase jitter introduced by the transceivers situated upstream on the serial link. According to the USB specifications, this phase shift must remain below +/−18.5 ns for an application in full speed, with a maximum authorized number of five hubs or intermediate repeaters. Each transceiver interposed in the serial link introduces phase jitter that depends on factors such as the stability of the supply voltage, the surrounding noise, the temperature, and the technology used to produce it.

The circuit RNGEN thus enables the phase jitter that occurs in the signal RxD received to be sampled. This sampling is performed by using the phase-shifted oscillator signals produced by the ring oscillator that is used by the communication interface UICT. The average frequency of the signal circulating in the ring oscillator RO is, in a classic manner, between 50 and 100 MHz, i.e., 4 to 8 times the frequency of the signal received RxD in the case of a Full Speed transmission. If the ring oscillator supplies eight phase-shifted signals P0-P7, the phase deviation between two signals of consecutive phases Pi and Pi+1 (i being a whole number between 0 and 6) is between 1.25 and 2.5 ns. If the eight signals are used to sample the phase jitter, this amounts to applying an equivalent sampling period of 1.25 to 2.5 ns. This sampling period is perfectly adapted for sampling phase jitter typically between −10 and +10 ns. The number RND resulting from this sampling has a highly random nature for the following reasons.

The phase jitter that is produced in the serial link USB is advantageously an external source of noise, which results from a combination of several independent primary sources of noise situated in the computer PC and in any hubs HB1, HB2 or repeaters. As the primary sources of noise depend on a large number of factors, they are very difficult to control. Unlike the solutions of previous practices that use a small internal source of noise, the phase jitter used in one embodiment of the present invention as a source of noise does not need to be amplified.

Furthermore, the circuit RNGEN enables a relatively large flow of random variables to be obtained: 3 bits upon each edge of the signal RxD, i.e., 3 bits at a frequency of 12 MHz. It is easy to increase this flow, by increasing the number of amplifiers OA in the ring oscillator RO, or by increasing the average frequency of the signal that propagates in the ring oscillator.

It shall be noted that one embodiment uses the presence of a ring oscillator in the integrated circuits equipped with a USB-type serial communication interface. Such a ring oscillator supplies several signals substantially of the same average frequency, phase-shifted in relation to one another by a substantially constant average phase deviation. These signals are logically combined with the signal received by the communication interface, and the signals obtained by these logic combinations are used to generate random numbers.

It will be understood by those skilled in the art that various alternative embodiments and applications of the present invention are possible. Thus, it is not essential to sample the signals P0-P7 upon each edge of the signal received RxD. The sampling can be carried out only upon each rising or falling edge of the signal received. To that end, the signal RxD only needs to be applied directly to the clock signal input of the flip-flops F0-F7. The flow of random numbers generated will then be smaller.

It is not necessary either for the phase deviation between the oscillator signals to be substantially constant. This feature comes from the use of a ring oscillator. The absence of this feature merely introduces a bias into the random nature of the numbers RND generated.

Embodiments of the present invention do not only apply to USB-type links. They can be applied to any data transmission link in which phase jitter can occur. Embodiments of the present invention do not apply exclusively to integrated circuits used in smart cards either. They can be applied more generally to any device equipped with a communication interface that must generate random numbers.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method for generating a random number, the method comprising:
   receiving a data transmission binary signal subjected to phase jitter;
   generating several oscillator signals substantially of a same average frequency and having distinct respective phases;
   sampling, via sampling circuits, a status of each of the oscillator signals upon the appearance of edges of the binary signal; and
   generating a random number using the status of each of the oscillator signals, wherein the sampling a status of each of the oscillator signals upon the appearance of edges of the binary signal comprises:
      providing the binary signal to first input of an exclusive OR gate and to an input of a flip-flop;
      providing a first one of the oscillator signals to a clock input of the flip-flop;
      providing an output of the flip-flop to a second input of the exclusive OR gate; and
      providing an output of the exclusive OR gate to inputs of the sampling circuits.

2. A method according to claim 1, wherein the value of the random number generated varies according to the position of the edge of the binary signal in relation to the edges of the oscillator signals.

3. A method according to claim 1, wherein an average phase deviation between two oscillator signals of consecutive phases is substantially constant.

4. A method according to claim 1, wherein the average frequency of the oscillator signals is at least four times greater than an average frequency of a data transmission rate of the data transmission binary signal.

5. A method according to claim 1, wherein there are eight oscillator signals, and an average phase deviation between two oscillator signals of consecutive phases is substantially equal to $\pi/4$.

6. A method according to claim 1, wherein the received binary signal conforms to a USB (Universal Serial Bus) standard.

7. A device for generating a random number, the device comprising:
   a data transmission binary signal input subjected to phase jitter;
   several oscillator signal inputs configured to receive as input oscillator signals having a substantially identical average frequency and distinct respective phases;
   sampling circuits configured to sample a status of each of the oscillator signals upon edges of the binary signal; and
   a logic circuit configured to generate bits of a random number according to the statuses of the oscillator signals,
   wherein the sampling circuits configured to sample a status of each of the oscillator signals upon edges of the binary signal comprise:
      an exclusive OR logic gate having an output connected to clock inputs of each of the sampling circuits; and
      a flip-flop, wherein a first input to the exclusive OR gate and an input of the flip-flop is connected to the binary signal input, a clock input of the flip-flop is connected to a first oscillator signal of the oscillator signals, and an output of the flip-flop is connected to a second input of the exclusive OR gate.

8. A device according to claim 7, wherein a value of the random number generated by the logic circuit varies according to a position of the edge of the binary signal in relation to edges of the oscillator signals.

9. A device according to claim 7, wherein an average phase deviation between two oscillator signals of consecutive phases is substantially constant.

10. A device according to claim 7, wherein the average frequency of the oscillator signals is at least four times greater than an average frequency of a data transmission rate of the data transmission binary signal.

11. A device according to claim 7, wherein there are eight of the oscillator signals, and an average phase deviation between two oscillator signals of consecutive phases is substantially equal to $\pi/4$.

12. A device according to claim 7, wherein the binary signal conforms to a USB (Universal Serial Bus) standard.

13. An integrated circuit comprising:
   a receive circuit for receiving a binary signal;
   a data processing unit connected to the receive circuit;
   a clock signal generating circuit for generating oscillator signals and being connected to the receive circuit; and
   a random number generating device having:
      a data transmission binary signal input subjected to phase jitter;
      several oscillator signal inputs configured to receive oscillator signals having a substantially identical average frequency and distinct respective phases, sampling circuits configured to sample a status of each of the oscillator signals upon edges of the binary signal, and a logic circuit to generate bits of a random number according to the statuses of the oscillator signals, to supply the data processing unit with random numbers, the random number generating device being connected to the clock signal generating circuit and to the receive circuit, wherein the receive circuit supplies the random number generating device with the binary signal, wherein the sampling circuits for sampling a status of each of the oscillator signals upon edges of the binary signal comprise:

an exclusive OR logic gate having an output connected to clock inputs of each of the sampling circuits; and a flip-flop, wherein a first input to the exclusive OR gate and an input of the flip-flop is connected to the binary signal input, a clock input of the flip-flop is connected to a first oscillator signal of the oscillator signals, and an output of the flip-flop is connected to a second input of the exclusive OR gate.

14. An integrated circuit according to claim 13, wherein the clock signal generating circuit comprises a ring oscillator configured to supply the random number generating device with oscillator signals substantially of a same average frequency and of distinct phases.

15. An integrated circuit according to claim 13, wherein the receive circuit conforms to a USB (Universal Serial Bus) standard.

16. A system comprising:

a serial link interface to receive a binary signal transmitted via a serial link;

a processing unit communicatively coupled to the serial link interface;

a clock signal generator operable to generate a plurality of oscillator signals; and a random number generator having:

an input operable to receive the binary signal transmitted via the serial link, the binary signal having undergone random phase shifts, a plurality of oscillator inputs operable to receive the plurality of oscillator signals, the plurality of oscillator signals having substantially identical average frequencies wherein each of the plurality of oscillator signals has a distinct phase shift, a plurality of sampling circuits to respectively sample the plurality of oscillator signals upon detecting edges in the binary signal, and a logic circuit to generate binary numbers corresponding to the respective sampling of the plurality of oscillator signals, wherein the random number generator supplies the processing unit with the binary numbers, wherein the plurality of sampling circuits to respectively sample the plurality of oscillator signals upon edges in the binary signal comprise:

an exclusive OR logic gate having an output connected to clock inputs of each of the sampling circuits; and a flip-flop, wherein a first input to the exclusive OR gate and an input of the flip-flop is configured to receive the binary signal, a clock input of the flip-flop is connected to a first oscillator signal of the plurality of oscillator signals, and an output of the flip-flop is connected to a second input of the exclusive OR gate.

17. The system of claim 16 wherein the binary numbers generated by the logic circuit correspond to a position of the edge of the binary signal relative edges of the respective oscillator signals.

18. The system of claim 16 wherein the clock signal generator includes a ring oscillator to generate the plurality of oscillator signals.

19. An integrated circuit comprising:

a ring oscillator circuit comprising a ring of amplifiers configured to supply, at ring oscillator circuit outputs, oscillator signals substantially of a same average frequency and of distinct phases; and a random number generating device having inputs connected to the ring oscillator circuit outputs, the random number generating device comprising:

a data transmission binary signal input subjected to phase Jitter;

sampling circuits configured to sample a status of each of the oscillator signals upon edges of the binary signal, and a logic circuit connected to the sampling circuits configured to generate bits of a random number according to statuses of the oscillator signals, wherein the random number generating device further comprises a logic circuit connected to the binary signal input and a first output of the ring oscillator circuit outputs and configured to cause the sampling circuits to sample the status of each of the oscillator signals upon each edge of the binary signal.

20. The integrated circuit of claim 19 wherein the logic circuit configured to cause the sampling circuits to sample the status of each of the oscillator signals upon each edge of the binary signal comprises:

an exclusive OR logic gate; and a flip-flop, wherein a first input to the exclusive OR gate and an input of the flip-flop is connected to the binary signal input, a clock input of the flip-flop is connected to the first output of the ring oscillator circuit outputs, an output of the flip-flop is connected to a second input of the exclusive OR gate, and an output of the exclusive OR gate is connected to clock inputs of the sampling circuits.

21. The integrated circuit of claim 20 wherein the logic circuit connected to the sampling circuits configured to generate bits of a random number includes a logic circuit configured to supply a random number upon each rising edge of an output signal generated at the output of the exclusive OR gate and cause the random number to vary according to a position of a rising edge of the output signal generated at the output of the exclusive OR gate in relation to rising edges of the oscillator signals.

* * * * *

UNITED STATES PATENT AND TRADEMARK OFFICE
CERTIFICATE OF CORRECTION

| | | |
|---|---|---|
| PATENT NO. | : 7,958,175 B2 | Page 1 of 1 |
| APPLICATION NO. | : 11/653185 | |
| DATED | : June 7, 2011 | |
| INVENTOR(S) | : Pomet et al. | |

It is certified that error appears in the above-identified patent and that said Letters Patent is hereby corrected as shown below:

Title Page
Item 75
"Alain Pomet, Marseilles (FR); Benjamin Duval, Saint Maximin (FR); Robert Leydier, La Londe les Maures (FR)" should read as --Alain Pomet, Rousset (FR); Benjamin Duval, Saint Maximin (FR); Robert Leydier, La Londe les Maures (FR)--.

Column 10
Claim 19, Line 24, "litter;" should read as --jitter;--.

Signed and Sealed this

Thirteenth Day of September, 2011

David J. Kappos
*Director of the United States Patent and Trademark Office*